(No Model.)
R. E. BRAKEY.
DROP REGULATING ATTACHMENT FOR SEED PLANTERS.
No. 440,736. Patented Nov. 18, 1890.
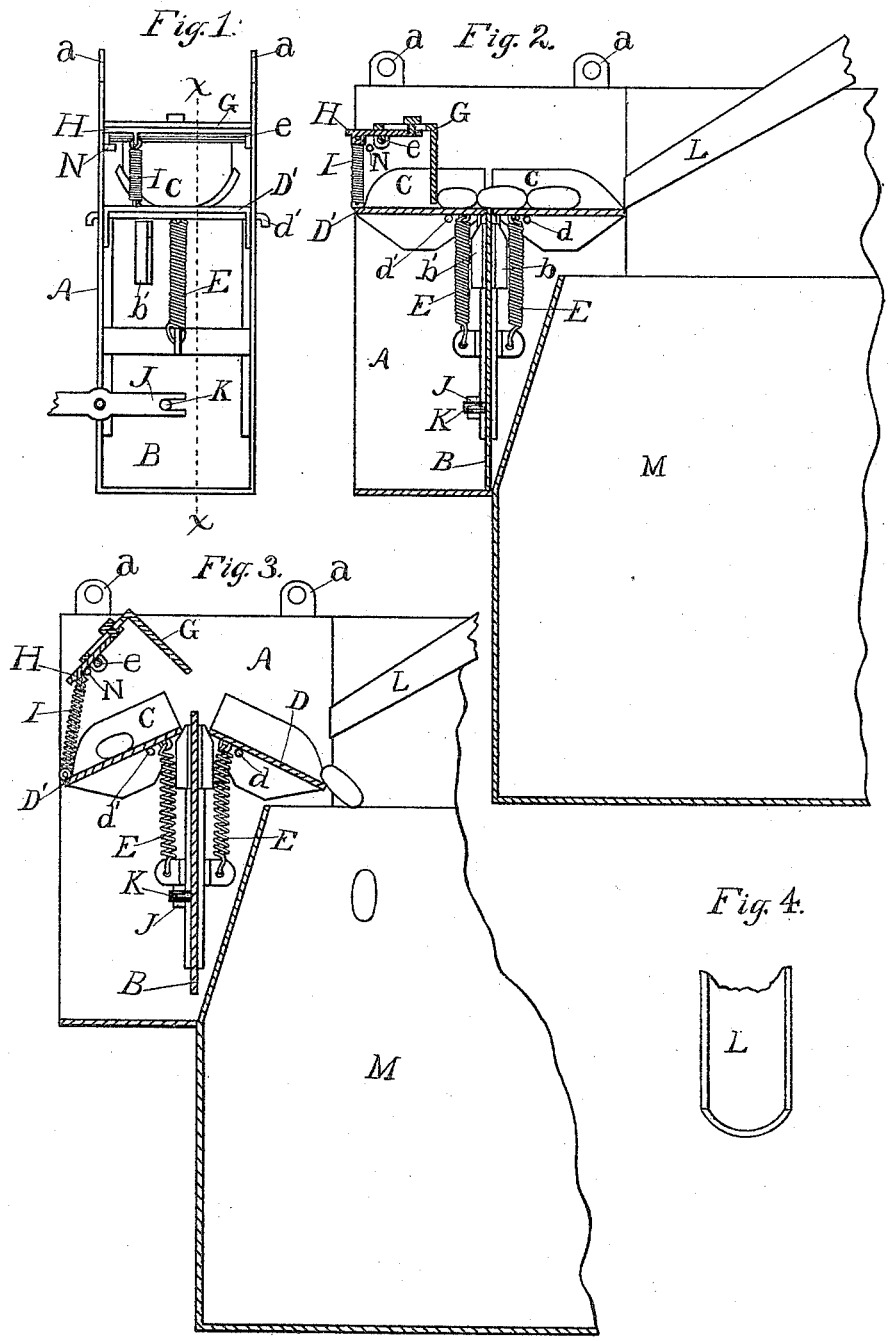

UNITED STATES PATENT OFFICE.

ROBERT E. BRAKEY, OF VENTURA, CALIFORNIA.

DROP-REGULATING ATTACHMENT FOR SEED-PLANTERS.

SPECIFICATION forming part of Letters Patent No. 440,736, dated November 18, 1890.

Application filed March 20, 1890. Serial No. 344,633. (No model.)

*To all whom it may concern:*

Be it known that I, ROBERT E. BRAKEY, a citizen of the United States, residing at Ventura, in the county of Ventura and State of California, have invented a new and useful Drop-Regulating Attachment for Seed-Planters, of which the following is a specification.

The purpose of my invention is to provide an attachment for seed-planters which will cause the planter to deposit at each time the exact number of seeds desired.

Seed-planters are arranged for adjustment as to the approximate number of seeds dropped at each operation of the dropping mechanism; but it sometimes occurs that it is desirable to uniformly drop only one seed in a place, or to drop exactly two seeds, or exactly three or some other number, and I am not aware that any device has heretofore been provided whereby this can be accomplished when the seeds to be dropped are not approximately uniform in size.

My invention is designed to be attached to an ordinary seed-planter to receive the seeds dropped by its dropping mechanism and to separate exactly one or more seeds therefrom and drop the same out of the machine, while it deposits the surplus seeds in a suitable receptacle prepared therefor, and from which they can be removed at intervals and replaced in the feed-box of the planter.

The main distinguishing feature of my invention is the combination of a vertically-reciprocating separating-slide, two tilting tables arranged one on each side thereof and pivoted to tilt downward therefrom, a gage to stop the seeds at the proper point on such tables, and means for simultaneously tilting the tables in opposite directions and elevating the slide, as hereinafter set forth.

The accompanying drawings illustrate my invention.

Figure 1 is a rear end view of my regulating attachment with its delivery-chute removed. Fig. 2 is a longitudinal section on line *x x*, Fig. 1, showing the tables in position before tilting and a row of seeds thereon. Fig. 3 is a like section showing the tables tilted to discharge the seeds. Fig. 4 is a section of the feed-chute.

A is the box or frame of the attachment, which is provided with suitable means for attachment to the machine, as indicated, by the perforated lugs *a*.

B is the vertically-reciprocating separating-slide transversely arranged to play across the passage C, along which the seeds pass in going through the attachment. This slide is so arranged that when it is in its lowest position its top is level with the bottom of such passage.

D D' are the tilting tables, which form the bottom of such passage and are arranged one on each side of the separating-slide, and are pivoted, respectively, upon pivot-rods *d d'*, passing across from side to side of the frame A. Each pivot is placed near that edge of its table which is in juxtaposition with the slide, so that the tendency of the greater part of the table is to tilt downward away from the slide, so that only a small portion thereof will rise when the table is tilted. That edge of each table next the slide is connected with the slide by suitable means—such as spring E—so arranged that when the slide is in its depressed position, as shown in Fig. 2, the tables will be held in their normal horizontal position, and so that when the slide is moved upward the tables will be left free to be tilted, as shown in Fig. 3. The lateral lugs *b b'* are respectively fixed to and project from the opposite sides of the slide to engage with the edge of their respective tables to tilt such tables when the separating-slide is moved upward its full extent. The lugs *b b'* are located about a quarter of an inch below the top of the slide, so that the slide may rise approximately that height before the lugs engage the tables to tilt them.

G is the pivoted adjustable gage-gate, which is arranged to extend into the seed passage-way over the rear table D' when such table is in its normal position. The pivot *e* of the gage is located nearly over the rear of table D', and the rear end of the attachment plate or lever H, by which such gage is connected with the pivot, projects beyond such pivot and is connected with the rear of the discharge tilting table D' by suitable means—such as the spring I, hinged thereto—so that when the discharge-table D' is tilted its rear end will operate the gage to raise it out of the way of the seed to let it pass down the table and out of the machine.

J represents a pivoted lever arranged to engage the slide through the medium of pivot K, projecting from the face of the slide, so that the operation of the lever will actuate the slide in its vertical movements. The lever is designed to be connected with the operative parts of the planter, so that it will be intermittently operated thereby at proper intervals.

Means for connecting the slide with the operative parts will readily suggest themselves to mechanics skilled in the art, and as such means form no part of my invention I have not attempted illustration thereof further than that of the lever J and pivot K.

L represents the feed-chute leading to the front table D. It will be understood that this chute is designed to lead from the ordinary dropping mechanism of the planter to conduct the seeds therefrom into the passage over the tables. Such dropping mechanism is not shown, as it is well understood by those skilled in the art.

The attachment plate or lever H, by which the gage-gate is mounted on its pivot $e$, is made adjustable as to length, so that the position of the gate can be changed relative to the slide, so as to leave more or less room for the seed between it and the slide, according as the different varieties of seeds vary as to size.

The chute L is preferably of a concave trough shape, as suggested in Fig. 4, so that the seeds will arrange themselves lengthwise in a row along the bottom thereof as they pass down therealong to the table, and yet avoiding all liability of the seeds becoming wedged into such chute.

M is the box for surplus seeds.

N is a stop to prevent the gage from being moved too far.

The operation is as follows: The planter being supplied with seeds in the usual manner and the gage being set to correspond to the size of seed being planted, the planter is advanced in the ordinary manner, and when the dropper operates to drop a charge of the seeds such seeds pass down the chute L and are deposited in the passage-way C upon the tilting tables, as suggested by Fig. 2. If it is designed to drop but one seed in a place, the gage is set at a distance from the slide approximately equal to the average length of the seeds being planted, and if the seed resting upon the rear table be shorter than the average length of the seeds being planted the seed in front of it will pass partly over the top of the separating-slide, so that on the initial movement of such slide as it rises such seed will be tilted forward onto table D, and upon the further upward movement of the slide the lugs $b\,b'$ engage the table to tilt it, as shown in Fig. 3, thus dumping the surplus seed into the box M, while the other seed is dropped out of the machine. If the rear seed is too long, its front end will rest upon the slide, which in rising tilts such seed back upon the rear table. By this invention a variation of about half-size is allowed over and above the average size of the seed.

Now, having described my invention, what I claim as new, and desire to secure by Letters Patent, is—

1. A drop-regulating attachment for seed-planters, comprising the combination of two tilting tables arranged with their ends together and pivoted to tilt from each other, the gage to stop the seeds, and means for tilting the tables in opposite directions.

2. The combination of the vertically-reciprocating separating-slide, the two tilting tables arranged one on each side thereof, the gage to stop the seeds, and means for operating the several parts simultaneously.

3. The combination set forth of the vertically-reciprocating slide provided with the lateral lugs, the two tilting tables arranged one on each side of such slide, the springs respectively connecting the tables with the slide, the pivoted gage, the spring connecting the gage with the discharge-table, and means for operating the slide.

R. E. BRAKEY.

Witnesses:
JAMES R. TOWNSEND,
J. W. COCHRAN, Jr.